United States Patent
Ziolkowski

(10) Patent No.: US 8,264,227 B2
(45) Date of Patent: Sep. 11, 2012

(54) MARINE EM EXPLORATION

(75) Inventor: Anton Ziolkowski, Edinburgh (GB)

(73) Assignee: MTEM Ltd, Edinburgh (GB)

( * ) Notice: Subject to any disclaimer, the term of this patent is extended or adjusted under 35 U.S.C. 154(b) by 565 days.

(21) Appl. No.: 12/310,471

(22) PCT Filed: Aug. 28, 2007

(86) PCT No.: PCT/GB2007/003245
§ 371 (c)(1), (2), (4) Date: Aug. 31, 2009

(87) PCT Pub. No.: WO2008/023194
PCT Pub. Date: Feb. 28, 2008

(65) Prior Publication Data
US 2010/0090701 A1    Apr. 15, 2010

(30) Foreign Application Priority Data

Aug. 25, 2006   (GB) .................................. 0616870.2

(51) Int. Cl.
*G01V 3/00* (2006.01)

(52) U.S. Cl. ............. 324/334; 324/337; 324/365; 702/5

(58) Field of Classification Search .......... 324/334–337, 324/365; 702/5–13; 703/2
See application file for complete search history.

(56) References Cited

U.S. PATENT DOCUMENTS

| | | | |
|---|---|---|---|
| 7,400,977 B2 * | 7/2008 | Alumbaugh et al. | 702/7 |
| 7,657,391 B2 * | 2/2010 | Alumbaugh et al. | 702/127 |
| 7,982,465 B2 | 7/2011 | Westerdahl et al. | |
| 2007/0061078 A1 * | 3/2007 | Lu et al. | 702/2 |
| 2009/0230970 A1 | 9/2009 | Ziolkowski | |
| 2009/0278541 A1 | 11/2009 | Westerdahl et al. | |
| 2009/0309599 A1 | 12/2009 | Ziolkowski | |
| 2010/0013486 A1 | 1/2010 | Ziolkowski et al. | |
| 2010/0134110 A1 | 6/2010 | Ziolkowski | |
| 2010/0188090 A1 | 7/2010 | Ziolkowski | |
| 2010/0201367 A1 | 8/2010 | Ziolkowski | |
| 2012/0011130 A1 | 1/2012 | Loseth et al. | |

FOREIGN PATENT DOCUMENTS

| | | |
|---|---|---|
| GB | 2 402 745 | 12/2004 |
| WO | 03023452 A1 | 3/2003 |
| WO | WO 2005/010560 | 2/2005 |
| WO | WO 2007/094676 | 8/2007 |
| WO | 2008023194 A3 | 2/2008 |
| WO | 2008099151 A2 | 8/2008 |

OTHER PUBLICATIONS

Tage Rosten, Lasse Amundsen; (2004); "Generalized electromagnetic seabed logging wavefield decomposition into UID-going components"; Annual International SEG Meeting in Tulsa, OK, Expanded Abstracts, XP008050100; pp. 592-595.

S.E. Johansen, H.E.F. Amundsen, T. Rosten, S. Ellingsrud, T. Eidesmo, A.H. Bhuyian; (2005); "Subsurface hydrocarbons detected by electromagnetic sounding"; First Break, vol. 23; XP-002454468; pp. 31-36.

International Search Report, Mar. 3, 2009.

* cited by examiner

*Primary Examiner* — Arleen M Vazquez

(57) ABSTRACT

A method for estimating the effects of an airwave in marine electromagnetic data measured using a source and at least one receiver. The method involves measuring the electromagnetic response at two different under water source-receiver separations and using measurements at the larger separation to estimate the airwave response at that separation. The airwave effect in the response measured at the shorter separation can then be determined using the estimated airwave response at the larger separation.

21 Claims, 5 Drawing Sheets

MARINE EM EXPLORATION

CROSS REFERENCE TO RELATED APPLICATION

The present application is the U.S. national stage application of International Application PCT/GB2007/003245, filed on Aug. 28, 2007, which international application was published on Feb. 28, 2008 as International Publication WO 2008/023194. The International Application claims priority of United Kingdom Patent Application GB 0616870.2 filed on Aug. 25, 2006.

The present invention relates to a method for removing the airwave from marine electromagnetic data. In particular, the invention relates to a technique for reducing the impact of the airwave in marine based multi-channel transient electromagnetic (MTEM) measurements.

BACKGROUND OF THE INVENTION

Porous rocks are saturated with fluids. The fluids may be water, gas or oil or a mixture of all three. The flow of current in the earth is determined by the resistivities of such rocks, which are affected by the saturating fluids. For instance, brine-saturated porous rocks are much less resistive than the same rocks filled with hydrocarbons. By measuring the resistivity of geological formations, hydrocarbons can be detected. Hence, resistivity measurements can be made in an exploration phase to detect hydrocarbons prior to drilling.

Various techniques for measuring the resistivity of geological formations are known, for example time domain electromagnetic techniques, as described in WO 03/023452, the contents of which are incorporated herein by reference. Conventionally, time domain electromagnetic investigations use a transmitter and one or more receivers. The transmitter may be an electric source, that is, a grounded bipole, or a magnetic source, that is, a current in a wire loop or multi-loop. The receivers may be grounded bipoles for measuring potential differences, or wire loops or multi-loops or magnetometers for measuring magnetic fields and/or the time derivatives of magnetic fields. The transmitted signal is often formed by a step change in current in either an electric or magnetic source, but any transient signal may be used, including, for example, a pseudo-random binary sequence. Measurements can be taken on land or in an underwater environment.

FIG. 1 shows a plan view of a typical setup for transient electromagnetic marine surveying. This has a bi-pole current source on or near the sea floor for transmitting a transient current between two electrodes. The time function of the current might be a simple step change in current or a more complicated signal such as a pseudo-random binary sequence. The response of the earth-water system is measured by a line of bi-pole receivers on or near the sea floor, each receiver measuring the potential difference between a pair of electrodes. All the electrodes are essentially in the same vertical plane. In use, the electromagnetic signal generated by the source of FIG. 1 can follow three transmission paths to the receiver electrodes, these being through the earth, through the water and through the air. In deep water, the airwave has a negligible impact. In contrast in shallow water, the signal that is transmitted through the water is negligible, but the airwave can have a significant impact and so make interpretation of the data difficult.

SUMMARY OF THE INVENTION

According to one aspect of the invention, there is provided a method for removing the effects of an airwave from marine electromagnetic data comprising providing a source and at least one receiver in the water; measuring the electromagnetic response at two source-receiver separations; and using the two measurements to remove the air wave contribution from the measurement at the shorter separation, thereby to provide an improved estimate of the earth response at the shorter separation. This can be done by scaling the measurement at the larger separation by a factor that is a function of or related to the ratio of the larger separation distance to the smaller and subtracting this scaled measurement from the measurement at the shorter separation. In this way, an improved measure of the earth response at the shorter separation can be recovered.

This method is particularly useful for the exploration for hydrocarbons, in which the depths of investigation are of the order of, say, 200 m to 4 km.

The function may be equal or related to the cube of the ratio of the larger separation distance to the smaller.

The ratio of the separations may be approximately five or more. The larger separation may be selected so that the earth response at the receiver is negligible, ideally substantially zero, and the response measured is essentially the airwave response.

Both separations may be large compared with the water depth; that is, at least five times greater. The depth of the source may be the same in both measurements and the depth of the receiver may be the same in both measurements.

According to another aspect of the invention, there is provided a system for measuring the earth response to electromagnetic signals applied in a shallow water environment, the system comprising a source and at least one receiver in the water arranged to allow measurements to be taken at two or more source receiver separations; and means for using a measurement at a larger one of the separations to estimate an air wave contribution in the measurement at the shorter separation. This can be done by scaling the measurement at the larger separation by a factor that is a function of or related to the ratio of the larger separation distance to the smaller and subtracting this scaled measurement from the measurement at the shorter separation. In this way, the earth response at the shorter separation can be recovered.

The function may be equal or related to the cube of the ratio of the larger separation distance to the smaller. The ratio of the separations may be approximately five or more.

Both separations may be large compared with the water depth; that is, at least five times greater. The depth of the source may be the same in both measurements and the depth of the receiver may be the same in both measurements.

According to yet another aspect of the invention, there is provided a computer program, preferably on a computer readable medium or data carrier, or a processor for removing the effects of an airwave from shallow water marine electromagnetic data as measured by at least one source and at least one receiver, the computer program or processor having code or instructions for using two measurements taken at two different source receiver separations to estimate the air wave contribution at the shorter separation and use this to determine the earth response at the shorter separation.

Code or instructions may be provided for scaling the measurement at the larger separation by a factor that is a function of or related to the ratio of the larger separation distance to the smaller, thereby to estimate the air wave contribution to the measurement at the shorter separation, and subtracting this scaled measurement from the measurement at the shorter separation. In this way, the earth response at the shorter separation can be recovered.

According to yet another aspect of the invention, there is provided a method for measuring an electromagnetic response, the method comprising positioning an electromagnetic source and at least one electromagnetic receiver underwater; transmitting an electromagnetic signal from the source to the receiver, wherein the transmitted signal comprises an earth component and an airwave component, and the receiver is positioned relative to the source so that the measured response is substantially due to the airwave.

BRIEF DESCRIPTION OF THE DRAWINGS

Various aspects of the invention will now be described by way of example only and with reference to the accompanying drawings, of which.

DETAILED DESCRIPTION OF THE DRAWINGS

The present invention provides a method for removing the effects of an airwave from shallow water marine electromagnetic data by varying the source-receiver separation and using measurements made at different source-receiver separations to estimate the contribution that the airwave makes to the signal measured at the receiver. The invention is illustrated using the model of FIG. 2, which is laterally invariant, so the responses depend only on the source-receiver separation r and time t.

Figure 1:
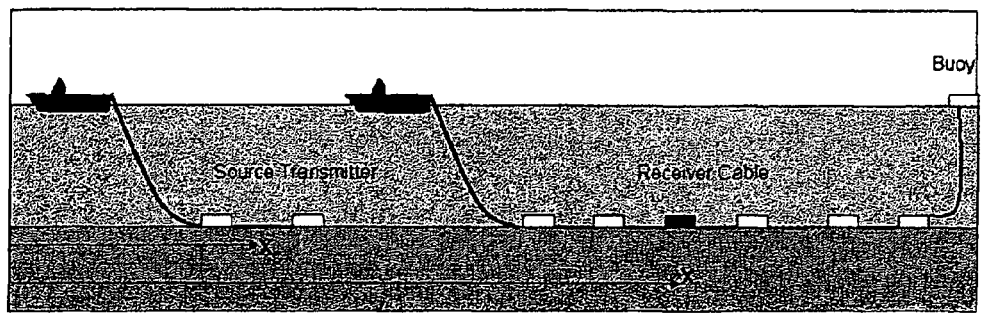
FIG. 1 shows a plan view of a typical setup for transient electromagnetic marine surveying.
Figure 2:
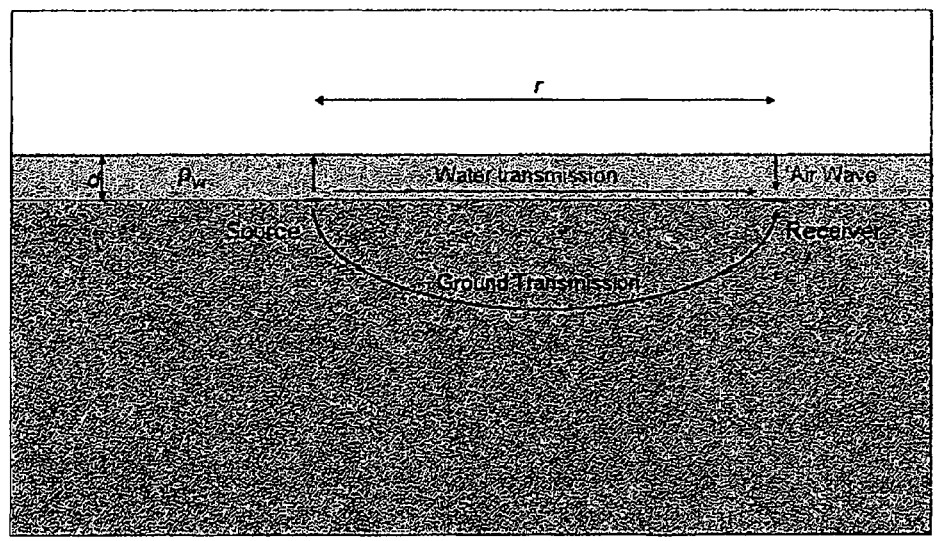
FIG. 2 is a model of the system of FIG. 1.

FIG. 2 shows a simplified model of the system of FIG. 1, in which the source and receiver are replaced by dipoles on the sea floor. Here, the seawater has a depth d and resistivity $\rho_w$ overlying the earth, which has a resistivity that is normally greater than $\rho_w$. The in-line receiver on the sea floor is separated from the dipole source by a distance r. In use, an electromagnetic signal generated by the source can follow three different transmission paths to the receiver electrodes, the first being through the earth, which is of course the desired path and gives a measure of the earth response, the second being through the water and the third being through the air. As shown, the air wave consists of three parts: a diffusive propagation component from the source to the sea surface, an instantaneous inductive effect in the air, and a diffusive propagation effect from the sea surface to the receiver. This is indicated by an upward arrow at the source, a line at the sea surface, and a downward arrow at the receiver.

After deconvolution of the measured data for the system response the resulting impulse response data can be expressed as:

$$x(x_s,x_r,t)=a(x_s,x_r,t)+w(x_s,x_r,t)+g(x_s,x_r,t), \quad (1)$$

in which $x(x_s,x_r,t)$ is the marine impulse response, $a(x_s,x_r,t)$ is the airwave response, $w(x_s,x_r,t)$ is the response of the water layer and $g(x_s,x_r,t)$ is the earth impulse response. If the water is shallow (that is, if d<<r), the bulk of the airwave arrives before the bulk of the earth response and, because the earth is generally more resistive than the seawater, the bulk of the earth response arrives before the bulk of the transmission through the water. Since the resistivity of the water (~0.3 ohm m) is usually substantially less than the resistivity of the earth, the horizontal propagation through the water is slower and more attenuated than the earth response, and so the water layer response $w(x_s,x_r,t)$ can often be neglected. Hence, for shallow water, only the airwave and earth impulse response have to be considered.

Figure 3:
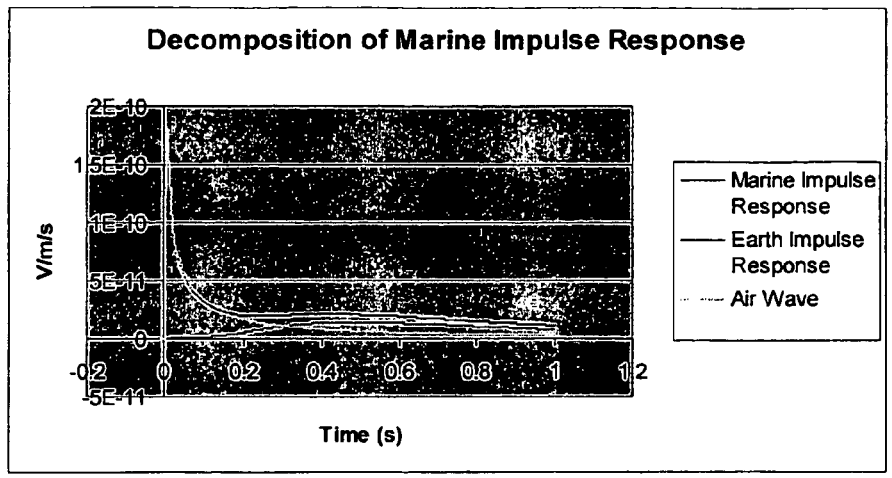
FIG. 3 shows an impulse computed at one of the receivers of FIG. 2, together with an estimate of the earth impulse and the airwave impulse.

FIG. 3 shows the form of the marine impulse response and two of its components: the airwave and the earth impulse response. The airwave begins with a sharp rise to a peak followed by a long monotonic decay to zero. This contrasts with the land case in which the airwave is an impulse confined to the start time t=0. In the land case the impulsive airwave arrives before the earth impulse response and is separated from it in time. In the marine case the amplitude and shape of the airwave depend on the source-receiver distance; the depth of water at source and receiver; the resistivity of the water and the resistivity of the earth below the sea floor. As the depth of water tends to zero, the airwave becomes a perfect impulse; that is, it tends to the land case. In deep water, say greater than 1 km, the amplitude of the airwave is negligible for useful electromagnetic frequencies and so it is possible to use continuous square-wave source signals to generate usable EM data. In contrast, in shallow water, say less than 300 m, the airwave is not negligible and interpretation of the data is difficult.

As shown in FIG. 3, the earth impulse response g(r,t) starts at zero, rises to a peak, and decays again; at large enough times it decays to zero. Whilst only a single peak is shown, it is possible that there is more than one. Consider the case of a uniform half space. The earth impulse response for a uniform half space of resistivity $\rho$ ohm m is described by the following analytic function:

$$g(\rho, r, t) = \frac{\rho}{8\pi\sqrt{\pi}\,c^3} \exp\left(\frac{-r^2}{c^2 4t}\right) t^{-\frac{5}{2}} \quad (2)$$

in which t is time in seconds, r is source-receiver separation in metres, $c^2=\rho/\mu$ and $\mu=4\pi\cdot10^{-7}$ henry/m. This function starts at zero, rises to a peak, and decays to zero again. The time of the peak is $$t_{peak,r} = \frac{\mu r^2}{10\rho}. \quad (3)$$

Figure 4:
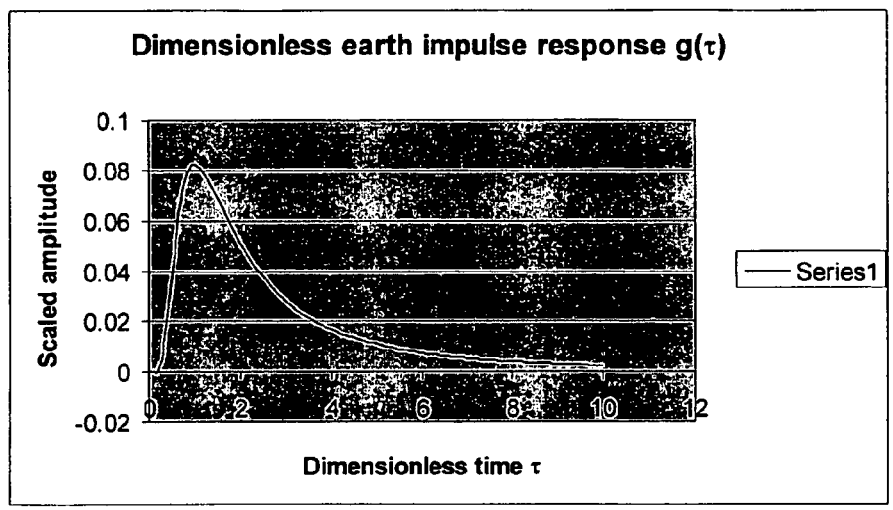
FIG. 4 shows a dimensionless earth impulse response.

FIG. 4 shows the form of the earth impulse response plotted as a function of dimensionless time $\tau$ where $$\tau = \frac{t}{t_{peak,r}}. \tag{4}$$

The time of the peak increases as the square of the source-receiver separation. The amplitude of the earth impulse response at the peak time is obtained by substituting formula (3) into (2) to give $$g(\sigma, r, t_{peak}) = \frac{10^{\frac{5}{2}}}{8\pi\sqrt{\pi}} \exp\left(\frac{-5}{2}\right) \frac{\rho^2}{\mu r^5}, \tag{5}$$

from which it is clear that the amplitude decreases as $r^{-5}$. This is of course true for the whole time function and not just for the peak value.

In the air there is negligible attenuation of electromagnetic waves and the amplitude of the in-line electric field of the source dipole decays as $r^{-3}$. If the water is of uniform depth, the vertical propagation effects at the source and the receiver are the same, regardless of the offset. Therefore the shape of the airwave as a function of time is independent of offset, but decays as $r^{-3}$. This can be expressed as follows:

$$a(r, t) = \left(\frac{r_0}{r}\right)^3 a_0(r_0, t), \tag{6}$$

in which $r_0$ is some reference offset; typically, $r_0$ is at least 5r. Thus the amplitude of the airwave decays as $r^{-3}$, while the amplitude of the earth response decays as $r^{-5}$. Furthermore, the time to the peak of the earth impulse response increases as $r^2$. It follows that at large enough offset the earth response is negligible compared with the airwave—up to a certain time. For the purposes of interpretation and inversion of the data it is known that the times of interest are not greater than $10t_{peak, r}$. In principle, therefore, the airwave can be estimated by making a measurement at a large enough offset $r_0$, where, for times of interest, the earth response and the horizontal response through the water are negligible. The resulting measurement can be considered almost pure airwave $a_0(r_0,t)$. The measurement at $r_0$ can then be used in equation (6) to estimate the airwave at offset r, which is subtracted from the data at r to recover the earth impulse response.

Figure 5:
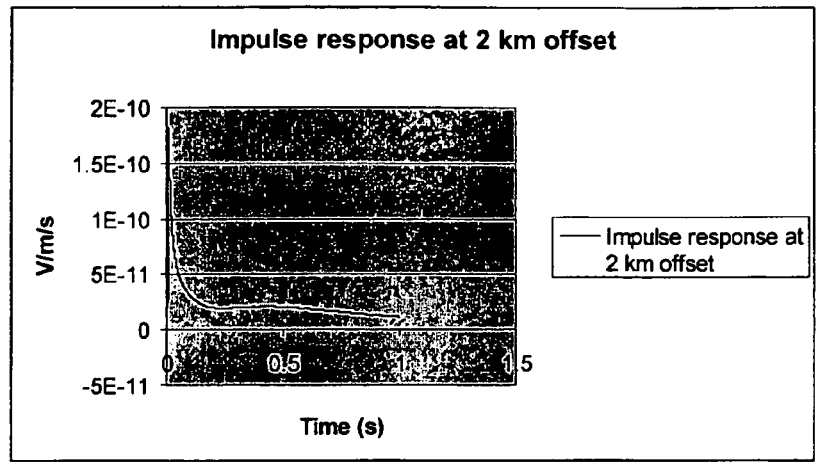
FIG. 5 shows an impulse response at 2 km for 1 ohm m halfspace beneath 100 m of water for a 1 A m dipole source and receiver on the sea floor.

FIG. 5 shows an impulse response at a 2 km offset for a 1 ohm m half space beneath a layer of water 100 m deep and with resistivity 0.3 ohm m; the 1 A m dipole source and receiver are on the sea floor. The sharp initial peak occurs at 0.008 s and has an amplitude of 1.82E-10 V/m/s. There is a second much broader peak at about 0.45 s with an amplitude of 2.4E-11 V/m/s. The derivative of the synthetic step response is the impulse response. The shape of the airwave can be estimated by looking at an offset that is large enough compared with this offset for the earth response to be negligible for times of interest.

Figure 6:
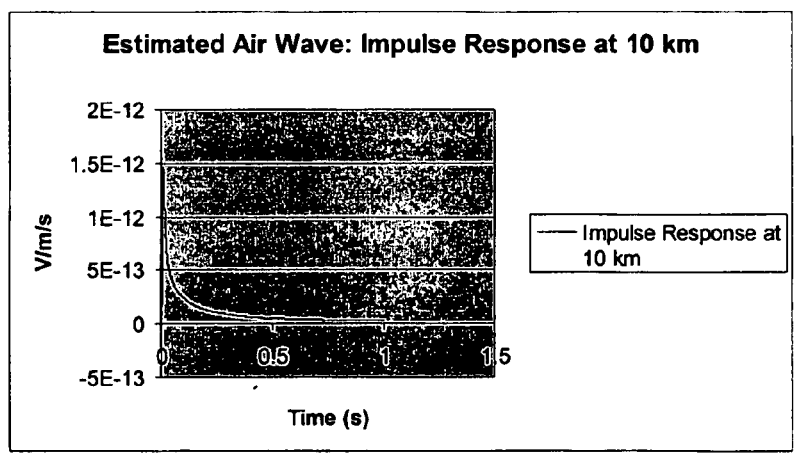
FIG. 6 shows an impulse response at 10 km for 1 ohm m halfspace beneath 100 m of water for the same dipole source and receiver as for FIG. 5.

FIG. 6 shows the impulse response at 10 km offset for 1 ohm m halfspace beneath 100 m of water; the dipole source and receiver are on the sea floor. The sharp initial peak occurs at 0.008 s and has an amplitude of 1.46E-12 V/m/s. There is no discernible second peak. However, it can be seen that the peak of the airwave occurs at exactly the same time as for the 2 km impulse response. Hence, this can be regarded as almost pure airwave $a_0(r_0,t)$, in which $r_0$ is 10 km. Scaling it according to equation (5), using r=2 km gives $a(r,t)=125 a_0 (r_0,t)$. The result is shown in FIG. 3. The estimated earth response in FIG. 3 is obtained by subtracting the estimated airwave from the marine impulse response.

Figure 7A:
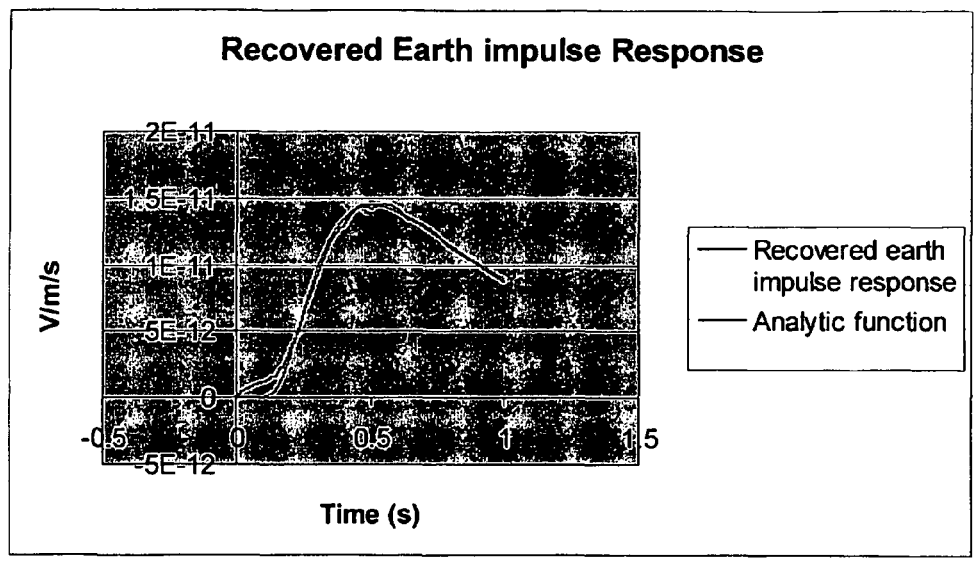
FIG. 7(a) shows the recovered earth impulse response compared with the analytic function over a time period of 0 to 1 s.
Figure 7B:
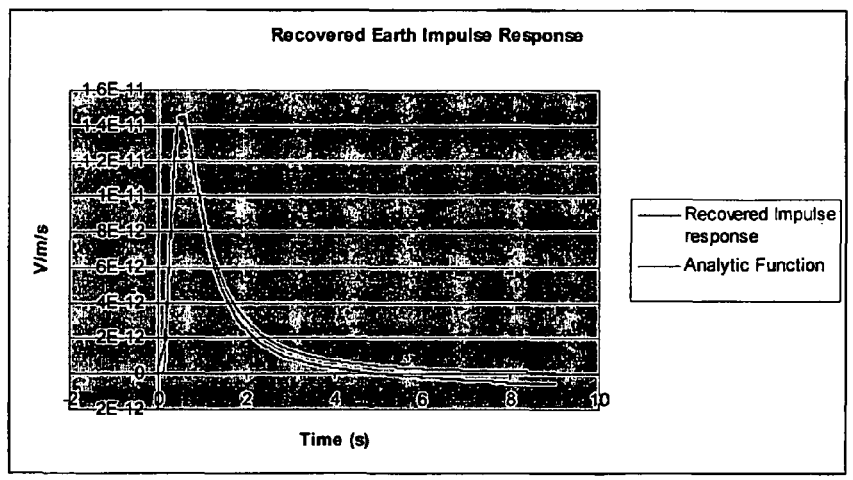
FIG. 7(b) shows the same earth impulse response and analytic function as FIG. 7(a), but over a time period of 0 to 9 s.
Figure 8:
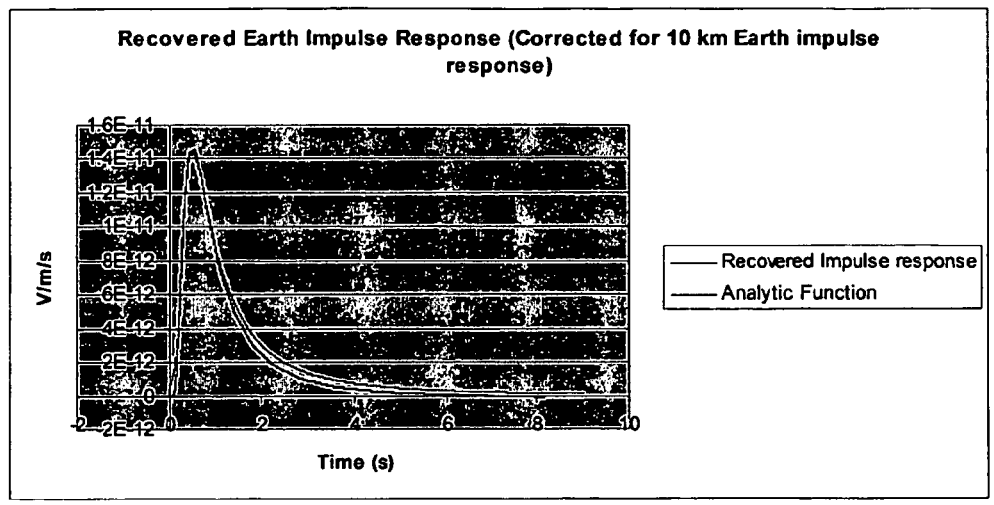
FIG. 8 shows the recovered earth impulse response, using an improved estimate of the airwave, compared with the analytic function.

A measure of the quality of this result is to compare the recovered impulse response with the analytic function: the impulse response of a 1 ohm m half space at an offset of 2 km, calculated using equation (2). This comparison is shown in FIG. 7(a) for 0 to 1 s and FIG. 7(b) for 0 to 9 s. The recovered earth impulse response and the analytic function closely resemble each other, although there are errors at early times and at late times. At early times, especially before 0.2 s, there is a deviation that is probably caused by errors in the numerical modelling, interpolation and numerical differentiation, not the theory. At late times the recovered response goes negative after about 5.1 s. This is because the airwave is slightly overestimated, as the measurement at the larger separation is not purely the result of the airwave, but instead includes some earth impulse response. An improved estimate of the airwave at offset r could be made by modifying the airwave estimate at $r_0$. Subtracting an estimate of the earth response from the impulse response at $r_0$ gives a better estimate of the airwave. The result is shown in FIG. 8.

In summary, the airwave decays as $r^{-3}$, while the earth response decays as $r^{-5}$. It follows that at large enough offsets, the response of the earth is negligible compared with the airwave—up to some time limit. At such offsets, typically five or more times the offset of interest, the impulse response is almost pure airwave and this can be scaled by the cube of the ratio of this offset to the offset of interest to provide an estimate of the airwave at the offset of interest. Subtraction of this estimated airwave from the impulse response at the offset of interest results in a close approximation to the impulse response of the earth without a water layer present.

Figure 9:
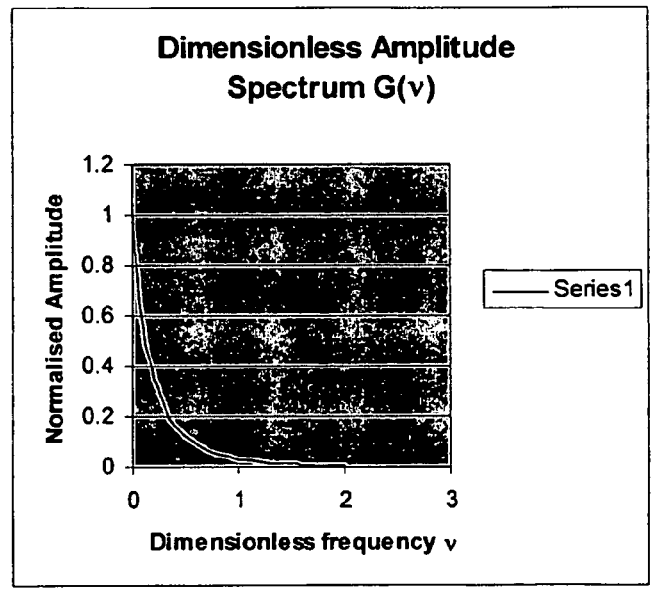
FIG. 9 shows an amplitude spectrum for the impulse response of FIG. 4 as a function of dimensionless frequency.

Considering the problem in the frequency domain allows more constraints to be put on the requirements for this method. The amplitude spectrum of the dimensionless earth impulse response of FIG. 4 is shown in FIG. 9. The dimensionless frequency parameter ν is defined as $$\nu = f t_{peak,r}. \tag{7}$$

From FIG. 9 it is clear that the highest usable dimensionless frequency of interest is no higher than $\nu_H=2$. Looking at FIG. 4, it is clear that the bulk of the response is over after approximately τ=10, corresponding to a dimensionless frequency of $\nu_L=1/10$. Hence, the ratio of highest to lowest usable frequencies is approximately $\nu_H/\nu_L=20$.

Consider measurements at two offsets r and $r_0$, with $r_0$ bigger than r. In the frequency bandwidth of interest at offset r the earth response is contaminated by the airwave. At the larger offset $r_0$ it is clear from a consideration of equation (3) that the time of the peak is greater than that at offset r by a factor $(r_0/r)^2$ and the bandwidth of the amplitude spectrum of the earth response is shifted to lower frequencies by the same factor. However, the bandwidth of the airwave is unchanged. By making the factor $(r_0/r)^2 \geq 20$, the bandwidth of the earth responses at r and $r_0$ do not overlap. Therefore, within the bandwidth of interest at r, the measurement at $r_0$ contains the airwave uncontaminated by the earth response. It follows that $(r_0/r) \geq \sqrt{20}=4.5$.

The principle of reciprocity states that the response of the earth is the same when the source and receiver are interchanged. Let the response be measured with source and receiver separation r, source depth a, and receiver depth b. Applying the principle of reciprocity, the response is the same when source and receiver are interchanged. The response includes the earth response and the airwave. The airwave part of the response is laterally invariant, so it is the same at offset r whether the source is at depth a and receiver at depth b, or when the source is at depth b, and receiver at depth a. At an offset $r_0$ the same argument applies. Hence, provided the depths of the source and receiver below the surface of the water are the same, only a single measurement of the airwave need be made for any selected measurement frequency bandwidth. This measurement can then be used to correct for airwave effects in measurements taken at many other source receiver pairs, provided corresponding source/receiver depths are used, as well as the selected bandwidth.

A skilled person will appreciate that variations of the disclosed arrangements are possible without departing from the invention. For example, whilst the description is focused primarily on recovery of the impulse response of the earth from transient marine EM impulse response data, the invention could equally be applied to continuous EM data collection methods. Accordingly the above description of the specific embodiment is made by way of example only and not for the purposes of limitation. It will be clear to the skilled person that minor modifications may be made without significant changes to the operation described.

The invention claimed is:

1. A method for estimating the effects of an airwave in marine electromagnetic data measured using a source and at least one receiver, the method comprising measuring the electromagnetic response at two different under water source-receiver separations; using one or more measurements at the larger separation to estimate the air wave response at that separation, and using this to estimate the air wave effect in the response measured at the shorter separation.

2. A method as claimed in claim 1 comprising scaling the measurement at the larger separation by a factor that is a function of the ratio of the larger separation to the smaller separation, thereby to determine an estimate of the airwave at the shorter separation, and subtracting this from the measurement at the shorter separation.

3. A method as claimed in claim 2 wherein the ratio of the separations is approximately five or more.

4. A method as claimed in claim 2 wherein the function is equal or related to the cube of the ratio of the larger separation distance to the smaller.

5. A method as claimed in any of claims 1 to 4 wherein both separations are large compared with the water depth.

6. A method as claimed in claims 1 to 4 wherein the depth of the source (a) is the same in both measurements and the depth of the receiver (b) is the same in both measurements.

7. A method as claimed in any of claims 1 to 4 wherein for one measurement the depth of the source is (a) and the depth of the receiver is (b), and for the other measurement the depth of the source is (b) and the depth of the receiver is (a).

8. A method as claimed in claims 1 to 4 wherein the source is a current bi-pole or a magnetic loop.

9. A method as claimed in claims 1 to 4 wherein the receiver is a bi-pole receiver.

10. A method as claimed in claims 1 to 4 wherein the electromagnetic measurements are transient electromagnetic measurements, for example MTEM, or continuous electromagnetic measurements.

11. A method as claimed in claims 1 to 4 wherein measurements are taken at more than two different under water source-receiver separations.

12. A system for measuring the earth response to electromagnetic signals applied in a shallow water environment, the system comprising a source and at least one receiver in the water arranged to allow measurements to be taken at two or more different source receiver separations; and means for using a measurement at a larger one of the separations to estimate an air wave contribution in the measurement at the shorter separation.

13. A system as claimed in claim 12 comprising means for scaling the measurement at the larger separation by a factor that is a function of or related to the ratio of the larger separation distance to the smaller separation distance.

14. A system as claimed in claim 13 comprising means for subtracting the scaled measurement from the measurement at the shorter separation.

15. A system as claimed in claim 13 wherein the function is equal or related to the cube of the ratio of the larger separation distance to the smaller.

16. A system as claimed in any of claims 12 to 15 wherein the larger separation is approximately five or more times greater than the shorter separation.

17. A system as claimed in any of claims 12 to 15 wherein both separations are at least five times greater than the depth of the water.

18. A system as claimed in any of claims 12 to 15 wherein the larger separation is selected so that the earth response measured at the receiver is negligible, preferably substantially zero.

19. A method, for removing the effects of an airwave from shallow water marine electromagnetic data as measured by at least one source and at least one receiver, using two measurements taken at two different source receiver separations to estimate the air wave contribution at the larger separation and using this to determine the earth response at the shorter separation.

20. A method as claimed in claim 19 comprising scaling the measurement at the larger separation by a factor that is a function of or related to the ratio of the larger separation distance to the smaller, thereby to estimate the air wave contribution to the measurement at the shorter separation.

21. A method as claimed in claim 20 comprising subtracting the scaled measurement from the measurement at the shorter separation.

* * * * *